(12) United States Patent
Shingala

(10) Patent No.: US 12,549,346 B2
(45) Date of Patent: Feb. 10, 2026

(54) DEVICE IDENTITY KEYS

(71) Applicant: Nordic Semiconductor ASA, Trondheim (NO)

(72) Inventor: Krishna Shingala, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 136 days.

(21) Appl. No.: 18/566,572

(22) PCT Filed: May 27, 2022

(86) PCT No.: PCT/EP2022/064433
§ 371 (c)(1),
(2) Date: Dec. 1, 2023

(87) PCT Pub. No.: WO2022/253706
PCT Pub. Date: Dec. 8, 2022

(65) Prior Publication Data
US 2024/0267211 A1  Aug. 8, 2024

(30) Foreign Application Priority Data

Jun. 2, 2021 (GB) .................................... 2107886

(51) Int. Cl.
*G06F 1/24* (2006.01)
*G06F 21/57* (2013.01)
(Continued)

(52) U.S. Cl.
CPC .......... *H04L 9/0866* (2013.01); *G06F 21/575* (2013.01); *H04L 9/0894* (2013.01);
(Continued)

(58) Field of Classification Search
CPC ....... H04L 9/0866; H04L 9/0894; H04L 9/14; H04L 9/30; H04L 9/3278; H04L 9/3247;
(Continued)

(56) References Cited

U.S. PATENT DOCUMENTS 10,742,421 B1 *  8/2020  Wentz ................... H04L 9/0897
10,984,107 B2     4/2021  Itkin
(Continued)

OTHER PUBLICATIONS

Haj-Yahya et al., "Lightweight Secure-Boot Architecture for RISC-V System-on-Chip," 20<sup>th</sup> *International Symposium on Quality Electronic Design*, Mar. 2019, pp. 216-223.
(Continued)

*Primary Examiner* — Volvick Derose
(74) *Attorney, Agent, or Firm* — Klarquist Sparkman, LLP

(57) ABSTRACT

An integrated-circuit device comprises a processor, a program memory, a hardware-based key generation system that outputs a selectable device identity key of a plurality of predetermined device identity keys, and a one-time programmable (OTP) memory for storing one or more public cryptographic keys. When a public cryptographic key is stored in the OTP memory, and when software is stored in the program memory, the device uses the public cryptographic key to determine whether the software stored in the program memory is validly signed by a private cryptographic key associated with the public cryptographic key, before the software is executed by the processor. The device controls which device identity key of the plurality of predetermined device identity keys is output by the hardware-based key generation system at least partly in dependence on the outcome of this determination.

20 Claims, 4 Drawing Sheets

(51) Int. Cl.
   *H04L 9/08*               (2006.01)
   *H04L 9/14*               (2006.01)
   *H04L 9/30*               (2006.01)
   *H04L 9/32*               (2006.01)
   *G06F 9/4401*           (2018.01)

(52) U.S. Cl.
   CPC ................. *H04L 9/14* (2013.01); *H04L 9/30* (2013.01); *H04L 9/3278* (2013.01); *G06F 9/4401* (2013.01); *G06F 2221/034* (2013.01)

(58) Field of Classification Search
   CPC ............ G06F 21/575; G06F 2221/034; G06F 2221/2149; G06F 21/44; G06F 21/64; G06F 21/72
   USPC ............................................................ 713/2
   See application file for complete search history.

(56) References Cited

U.S. PATENT DOCUMENTS

| | | | | |
|---|---|---|---|---|
| 2014/0189890 A1* | 7/2014 | Koeberl | ................. | G09C 1/00 |
| | | | | 726/34 |
| 2015/0113278 A1* | 4/2015 | Cocchi | ................. | H04L 63/0853 |
| | | | | 713/171 |
| 2015/0180865 A1* | 6/2015 | Wong | ................... | H04L 9/3231 |
| | | | | 726/4 |
| 2016/0065370 A1* | 3/2016 | Le Saint | ................. | H04L 9/321 |
| | | | | 713/155 |
| 2016/0065378 A1* | 3/2016 | Kim | ....................... | G06F 21/602 |
| | | | | 713/184 |
| 2016/0127128 A1* | 5/2016 | Chen | ..................... | H04L 9/0897 |
| | | | | 713/189 |
| 2017/0048070 A1* | 2/2017 | Gulati | ................... | H04L 9/3268 |
| 2017/0302459 A1* | 10/2017 | Fenner | .................. | H04L 9/3234 |
| 2018/0145988 A1* | 5/2018 | Carson | ................. | H04L 9/0861 |
| 2019/0253417 A1* | 8/2019 | Kim | ..................... | G06F 15/7807 |
| 2019/0325137 A1* | 10/2019 | Itkin | ........................ | H04L 9/30 |
| 2021/0036869 A1* | 2/2021 | Don | ..................... | H04L 9/3263 |
| 2022/0067166 A1* | 3/2022 | Kwon | .................... | G06F 21/64 |
| 2022/0131709 A1* | 4/2022 | Nix | ...................... | H04L 9/3252 |
| 2022/0231858 A1* | 7/2022 | Dover | ..................... | H04L 63/12 |

OTHER PUBLICATIONS

International Search Report and Written Opinion for PCT/EP2022/064433, dated Sep. 20, 2022, 16 pages.
IPO Combined Search and Examination Report under Sections 17 and 18(3) for Great Britain Application No. 2107886.0, dated Mar. 9, 2022, 10 pages.
Kumar et al., "ITUS: A Secure RISC-V System-on-Chip," 2019 32$^{nd}$ *IEEE International System-on-Chip Conference*, Sep. 2019, pp. 418-423.

* cited by examiner

DEVICE IDENTITY KEYS

CROSS REFERENCE TO RELATED APPLICATIONS

This is the U.S. National Stage of International Application No. PCT/EP2022/064433, filed May 27, 2022, which was published in English under PCT Article 21(2), which in turn claims the benefit of Great Britain Application No. 2107886.0, filed Jun. 2, 2021.

BACKGROUND

This invention relates to the generation of a device identity key for an integrated-circuit (IC) device.

It is known for integrated-circuit devices, such as system-on-chips (SoCs), to store a public cryptographic key associated with a remote party, such as a manufacturer or system operator. The public key can be used by the device to verify (and trust) software as having been validly issued by the remote party, by checking that the software has been validly signed by a private cryptographic key associated with the party's public key. Such verification may be a step of a secure boot process for the device.

It is also known for integrated-circuit devices, such as system-on-chips (SoCs), to store a unique device identity key. These may be loaded onto a device from outside, e.g. during manufacture, but for the greatest security they may be generated on the device itself—e.g. using a physical-unclonable-function (PUF) unit that generates an unchanging, device-specific value, commonly referred to as a PUF key. The device identity key (e.g. PUF key) is typically kept secret within the device. It can be used by the device for cryptographic processes, such as providing a seed for deriving private cryptographic keys or public-private key pairs. The device identity key can thus serve as a form of secret digital "fingerprint" unique to the particular device.

A silicon-based integrated-circuit PUF unit can generate a unique PUF key by exploiting extremely subtle manufacturing variations that are unique to each device even across a set of devices all fabricated using the same mask. The PUF unit is "unclonable" in that it is practically impossible to duplicate a PUF unit such that two units generate the same PUF key.

An integrated-circuit device may use a device identity key in order for other devices, in communication with the device, to be able to ascertain the identity and/or authenticity of the device.

For example, a cryptographic key pair, derived from a device identity key, may be used for device attestation. This can allow a device, such as a network Internet-of-Things (IoT) device, to attest the integrity of a secure environment of the device to a remote party. Such secure environments can be used to establish a root of trust for the device, e.g. using a secure boot process, thereby assuring the remote party of the integrity of software executing on the device.

Device identity keys may also be used more generally, e.g. to enable a remote party, such as a system operator, to recognise devices under its control. The remote party may store public cryptographic keys that are paired with corresponding private keys of the devices, generated from the device identity keys. These can be used to identify devices which may be granted access to certain services and/or data, e.g. software/firmware updates. When a device seeks access to these services and/or data, the device can use its device identity key to prove its identity to the remote party and, if successful, the device is given access to the services and/or data. If the verification or attestation fails, however, then the device may be denied access to these services and/or data. This could occur if the device was manufactured by a third party (i.e. it is not genuine), or if the device is genuine but has been modified by a third-party, or if the device is authentic but running unauthorised third-party software/firmware, etc.

Such approaches can provide good security when one party manages a set of such devices. However, current approaches have shortcomings when it is desired for devices to be able to be managed securely by one or more of multiple different parties—e.g. by a device manufacturer and a system operator. In particular, current approaches may increase the risk of the device identity key being compromised.

Embodiments of the present invention seek to provide more versatile and secure approaches to managing device identity keys.

SUMMARY OF THE INVENTION

When viewed from a first aspect, the present invention provides an integrated-circuit device comprising:
  a processor;
  a program memory;
  a hardware-based key generation system configured to output a selectable device identity key of a plurality of predetermined device identity keys; and
  a one-time programmable memory for storing one or more public cryptographic keys,
wherein the device is configured:
  when a public cryptographic key is stored in the one-time programmable memory, and when software is stored in the program memory, to use the public cryptographic key to determine whether the software stored in the program memory is validly signed by a private cryptographic key associated with the public cryptographic key, before the software is executed by the processor; and
  to control which device identity key of the plurality of predetermined device identity keys is output by the hardware-based key generation system at least partly in dependence on an outcome of said determination.

When viewed from a second aspect, the present invention provides a method of generating a predetermined device identity key for an integrated-circuit device, the device comprising:
  a processor;
  a program memory;
  a hardware-based key generation system configured to output a selectable device identity key of a plurality of predetermined device identity keys; and
  a one-time programmable memory for storing one or more public cryptographic keys,
wherein the method comprises:
  using a public cryptographic key stored in the one-time programmable memory to determine whether software stored in the program memory is validly signed by a private cryptographic key associated with the public cryptographic key, before the software is executed by the processor; and
  controlling which device identity key of the plurality of predetermined device identity keys is output by the hardware-based key generation system at least partly in dependence on an outcome of said determination.

Thus it will be seen that embodiments provide an integrated circuit device able to which of a plurality of different device identity keys to use depending upon whether there is a public cryptographic key, stored in the one-time programmable (OTP) memory, that verifies the software (e.g. firmware for the device) that is currently stored in the program memory. A device embodying the invention may thus effectively select which of the plurality of device identity keys to use based on the identity of the issuer or developer of the software stored in the program memory, for which a public signature-verification key is stored in the OTP memory. This means that the device can be configured to generate a first device identity key when software developed by a first party (e.g. a manufacturer of the device), and a corresponding public key associated with the first party, are stored on the device, and to generate a second device identity key, different from the first, when software developed by a second party (e.g. a system integrator), and a corresponding public key associated with the second party, are stored on the device.

In some embodiments, a second party (e.g. a customer) may be able to override a public key that may have been put on the device by a first party (e.g. stored in read-only memory or in a different region of the OTP memory), by loading a public key associated with the second party to the OTP memory and by installing second-party firmware, signed using a private key of the second party. The device may, in response, generate a particular device identity key, which is preferably inaccessible to the first party, because this particular device identity key is only output by the key generation system after loading a public key to a particular region of OTP memory, which it is only possible to do once. This can provide greater security to the second party (e.g. a customer), who does not have to share a device identity key with the first party (e.g. manufacturer). It may also similarly provide greater security to the first party, who may also be able to use a respective device identity key that is not accessible to the second party.

Controlling which device identity key is used based on what software is validly loaded in the program memory provides a convenient mechanism for associating the device identity with the software. The device identity key of the device may effectively be linked to the software stored in the program memory of the device. This association between device identity key and software may facilitate embodiments to implement a secure boot process, e.g. for establishing a software-issuer-specific root of trust (ROT) for the device, and for enabling the device to attest the integrity of both the device hardware and software to the issuer of the software.

Devices fabricated according to the same hardware design may thus be capable of supporting any of a plurality of different device identity keys (and hence operationally different roots of trust) depending on what software is written to the program memory of each device. Moreover, a single device may be caused to change device identity key, e.g. after integration into a larger system, by installing new software to its program memory and/or by writing a new private cryptographic key to a region of the OTP memory.

The device may comprise a read-only memory (ROM) storing software instructions for execution by one or more processors of the device. The software instructions may comprise boot code that the device is configured to execute in response to the device being reset or booted. The ROM may store instructions for determining whether software stored in the program memory is validly signed by a private cryptographic key associated with a public cryptographic key stored in the OTP memory. The ROM may store instructions for controlling which device identity key of the plurality of predetermined device identity keys is output by the hardware-based key generation system.

The device may be configured to control which device identity key of the plurality of predetermined device identity keys is output by the hardware-based key generation system at least partly in dependence on the location (e.g. a region or address) within the OTP memory of a public cryptographic key that is associated with a private cryptographic key used to sign software stored in the program memory.

The device (e.g. boot code stored on the device) may be configured for accessing public cryptographic keys from a plurality of (e.g. two) predetermined regions of the OTP memory. In a set of embodiments, the OTP memory comprises a first region for storing a first set of one or more public cryptographic keys and a second region for storing a second set of one or more public cryptographic keys. The first region may be suitable (e.g. sized) for storing one or more first public cryptographic keys each associated with a respective first private cryptographic key used to digitally sign software stored in the program memory. The second region may be suitable (e.g. sized) for storing one or more second public cryptographic keys each associated with a respective second private cryptographic key used to digitally sign software stored in the program memory. The first public and private cryptographic keys may be associated with a first party, and the second public and private cryptographic keys may be associated with a second party. Hence, the first region of the may be associated with the first party, and the second region may be associated with the second party. The first party may be a manufacturer of the device, and the second party may be an owner of the device, who may also be a customer of the first party (e.g. being a system integrator who incorporates the SoC into a more complex electronic product).

In doing this, the first party (e.g. manufacturer) is able to determine whether the program memory of the device stores software originating from said first party. The first party may store, in an external database, a plurality of public cryptographic keys, each public key being associated or paired with a respective first-party-specific device identity key of a respective device. The first party may then use the database to determine, using a suitable cryptographic communication protocol, whether a device identity key generated by a device is validly associated with one of the stored public keys, and thereby recognise and verify the integrity of the device in dependence on this determination. If there is no valid association found, the first party is able to determine that the device does not have software originating from the first party installed in the program memory thereof, and can respond accordingly. Furthermore, the second party (e.g. customer) is able to retain greater privacy and control over the device when software originating from said second party is installed in the device, as the device will then generate a different, second-party-specific device identity key which will not be recognised by the first party and thus the first party is prevented from attesting the device. This ability to generate different device identity keys can thus enhance the security of the device. The second party may store a public cryptographic key associated or paired with a second-party-specific device identity key output by the hardware-based key generation system in an external database of their own, enabling the second party to recognise and verify the integrity of the device using a similar mechanism of detecting a valid association between a device identity key and a public cryptographic key stored in the database, and respond accordingly. Thus, the device may be configured to control the hardware-based key generation system to output a selectable device identity key of two predetermined device identity keys, the key being selected in dependence on which region of the OTP memory stores a public cryptographic key that verifies software installed in the program memory of the device.

The device manufacturer may fill the first region of the OTP memory during manufacture (e.g. within one or more keys), thereby ensuring that a customer cannot store keys into the first region, and so ensuring that a customer cannot ever cause the device to generate a manufacturer-specific device identity key with a customer key in the first region.

The OTP memory may comprise a number of regions equal to the number of said predetermined device identity keys.

In a set of embodiments, each device identity key is a private key of a respective public-private key pair. The hardware-based key generation system may be configured for generating a respective public key associated (e.g. paired) with each of the predetermined device identity keys. The device identity key may comprise a cryptographic key that can enable an external party in communication with the integrated circuit device to verify an identity and/or an integrity of the integrated circuit device. The device may be configured to use both the device identity key and a public cryptographic key stored in the OTP memory for establishing a root of trust for the device. The device may be configured to use the device identity key to attest, to an external party, an integrity of some or all the software stored in the program memory. One or more public cryptographic keys each associated or paired with a respective one of the plurality of the predetermined device identity keys may be held in an external database, and the database may be used to determine whether the device identity key output by the hardware-based key generation system is validly associated with one of the public keys held in the database in order to confirm an identity and/or integrity of the integrated circuit device.

The hardware-based key generation system may be configured to output only one device identity key of the plurality of the predetermined device identity keys (potentially multiple times, but preferably only once) after each reset of the device. Once it has output a selected device identity key, the key generation system may be prevented, by hardware configuration, from outputting any other device identity key of the predetermined device identity keys until after the device has next been reset. This may help provide confidence to a customer that the device manufacturer cannot physically ever access the customer-specific device identity key. Moreover, the hardware-based key generation system may be configured to output any device identity key at most once after each reset of the device. This can help reduce the risk of a software-based attack or a side-channel attack on the key generation system. By implementing both these mechanisms, embodiments may be able to ensure that only one device identity key can be generated after each reset, and that this one key can be output at most once after each reset—e.g. during a secure boot process of the device.

In a set of embodiments, the hardware-based key generation system comprises a physical-unclonable-function (PUF) unit. The PUF unit may be configured to output a PUF key comprising a predetermined bit sequence. The PUF unit may comprise a plurality of binary cells, each binary cell being configured to generate a single bit of a PUF key based on random manufacturing variations therein. Each binary cell may comprise two transistors arranged such that random manufacturing variations between the two transistors determines the output of the binary cell.

In a set of embodiments, the PUF unit is configured to output a selectable PUF key of a plurality of predetermined PUF keys. Each of the plurality of predetermined PUF keys output by the PUF unit may be generated using a subset of the plurality of binary cells. The outcome is stable and consistent, yet random and unpredictable between different SoC 10 devices all built to the same design. The PUF unit may be configured to output a PUF key a maximum of one time per reset or boot of the integrated circuit device.

In a set of embodiments, the hardware-based key generation system further comprises a key derivation unit configured to receive the PUF key output by the PUF unit, and to derive and/or output a device identity key in dependence on the PUF key received. The key derivation unit may be configured to perform a hash function and/or a key expansion function and/or a key-pair generation operation on the received PUF key. The key derivation unit may comprise a processor and a coupled read-only memory (ROM) storing software instructions for causing the processor to perform the hash function. Alternatively, the key derivation unit may comprise hardware—e.g. a transistor arrangement—configured to perform this function.

In a set of embodiments, the OTP memory comprises one or more regions for storing revocation data, such a set of revocation bits, each revocation bit being associated with a respective public cryptographic key stored in the OTP memory. The state of each revocation bit may be indicative of whether the associated public key has been revoked. Each revocation bit may be stored in the same region as its associated public key. As used herein, the term revoked is used to describe a public cryptographic key that remains stored in the OTP memory but is prevented from being used by the device in order to verify software stored in the program memory of the device.

The device may use the revocation data to determine whether a public cryptographic key stored in the OTP memory has been revoked. The device is preferably configured never to use any public cryptographic key that has been revoked to determine whether the software stored in the program memory is validly signed.

In a preferred set of embodiments, the device is configured to attempt verification of software stored in the program memory using one or more keys (e.g. each unrevoked key) stored in the second region of the OTP memory, before attempting verification of software stored in the program memory using one or more keys (e.g. each unrevoked key) stored in the first region of the OTP memory.

The device is preferably configured not to access any key from the first region of the OTP memory in response to a successful verification of software stored in the program memory using a key stored in the second region.

In a preferred set of embodiments, the device is configured to revoke each public cryptographic key stored in the first region of the OTP memory in response to determining that software stored in the program memory is validly signed using a private cryptographic key associated with a public cryptographic key stored in the second region of the OTP memory.

In this way, any manufacturer keys stored in the first region will be automatically revoked as soon as a customer has loaded customer keys to the second region that validly verify customer-installed firmware. This can advantageously ensure that the device can never revert to using the manufacturer's identity, after customer firmware has been successfully installed.

The software stored in the program memory may comprise a digitally signed boot code or firmware image.

The device may be configured to attempt verification of software stored in the program memory each time the device is booted. It may be configured to use the public cryptographic key to determine whether the software stored in the program memory is validly signed as part of a boot process of the device. It may be configured to cause the hardware-based key generation system to output a device identity key of the plurality of predetermined device identity keys as part of a boot process of the device. The boot process may be at least partly controlled by software instructions stored in a ROM or OTP memory of the device.

The device identity key (which may be the private key of an asymmetric public-private key pair) is preferably stored securely on the device and is preferably never output from the device. The device may comprise a key storage memory, to which the hardware-based key generation system may be configured to output a device identity key. The device comprise a cryptographic engine, to which the hardware-based key generation system may be configured to output a device identity key.

In a set of embodiments, the device comprises a cryptographic engine and is configured to use the cryptographic engine for determining whether software stored in the program memory is validly signed by a private cryptographic key associated with a public cryptographic key stored in the OTP memory. The device (e.g. cryptographic engine) may be configured to determine whether to revoke public keys stored in the OTP memory (e.g. stored in the first region of the OTP memory, which may be a region reserved for device-manufacturer public keys). It may revoke one or all keys stored in a first region of the OTP memory in response to determining that software stored in the program memory is validly signed by a private cryptographic key associated with the public cryptographic key stored in a second region of the OTP memory (e.g. in a region reserved for customer public keys). The cryptographic engine may comprise a processor coupled to a read-only memory, or may comprise a finite state machine that may be configured to perform one or more of these operations.

In a set of embodiments, the device comprises a secure cryptographic module comprising the OTP memory, the key derivation unit, and the cryptographic engine. It may comprise a secure bus configured to operate independently from a system bus of the device, which may connect the cryptographic engine with the OTP memory and/or the key derivation unit.

In a set of embodiments, the device comprises a read-only memory (ROM) storing software instructions for causing the device to perform any one or more of the operations disclosed herein.

The OTP memory may be implemented using any suitable write-once technology. For instance, it may be implemented using fuses, or by non-volatile memory cells that lack erase circuitry, or the device may comprise digital logic that prevents the OTP memory being erased ever or that prevents the OTP memory being erased unless the entire device memory, including the program memory, is also erased.

Read-only memory (ROM) as referred to herein may comprise mask ROM or may comprise OTP memory which may be written during manufacture of the device.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION OF THE DRAWINGS

Figure 1:
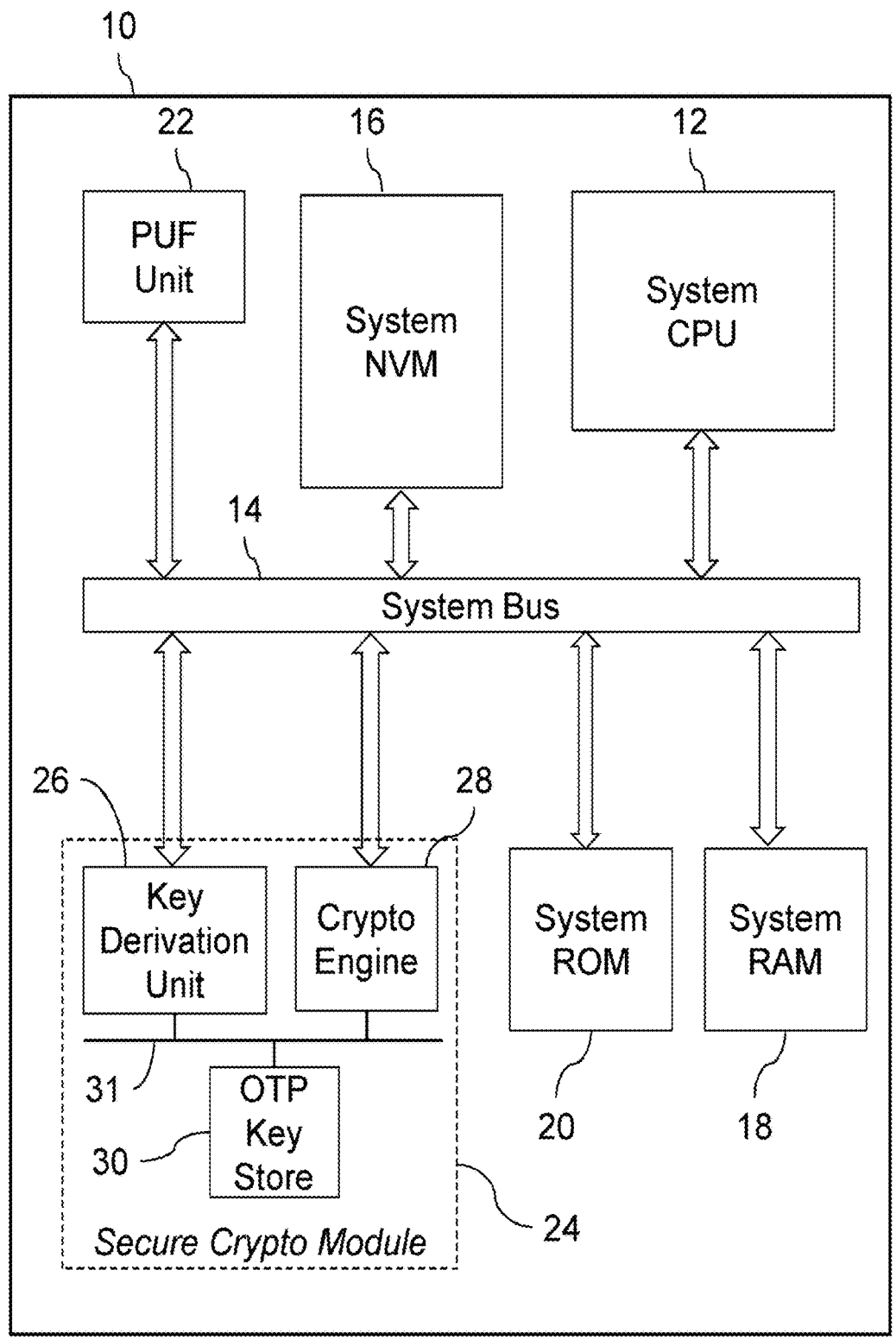
FIG. 1 is a schematic block diagram of an integrated-circuit (IC) system-on-chip (SoC) in accordance with an embodiment of the invention.

FIG. 1 shows a schematic block diagram of an integrated-circuit (IC) system-on-chip (SoC) 10 in accordance with an embodiment of the invention. It comprises a system central processing unit (CPU) 12 (a processor) which is connected via a system bus 14 to a system non-volatile memory (NVM) 16, a system random access memory (RAM) 18, and a system read-only memory (ROM) 20. The NVM 16, RAM 18 and ROM 20 may each store data and/or software for execution by the CPU 12. At least a portion of the NVM 16 provides a program memory as described herein.

Also coupled to the system bus 14 are a physical-unclonable-function (PUF) unit 22, a key derivation unit 26 and a cryptographic engine 28. The key derivation unit 26 and the cryptographic engine 28 sit within a secure cryptographic module 24, coupled to the system bus 14, which additionally contains a one-time-programmable (OTP) non-volatile memory 30, hereinafter referred to as the OTP key store 30. The key derivation unit 26, the cryptographic engine 28 and the OTP key store 30 are connected to one another via a secure bus 31, which is not directly coupled to the system bus 14. The PUF unit 22 and the key derivation unit 26 together provide a hardware-based key generation system as described herein.

The SoC 10 may comprise further components not shown in FIG. 1 which are omitted for the sake of brevity. For example, the SoC 10 may further comprise radio transceiver circuitry in order to enable wireless communication between the SoC 10 and other devices (e.g. a wireless modem). Such radio transceiver circuit may include: processors, oscillators, filters, amplifiers, digital to analogue converters (DACs), analogue to digital converters (ADCs), antennas, etc. The SoC 10 may also comprise one or more interfaces for connecting to other devices over wired connections, e.g. a serial peripheral interface (SPI).

The system NVM 16 may store software (e.g. firmware) which can be executed by the CPU 12. At least some of the software may be required to pass a verification process before it can be executed by the CPU 12, in order to increase security. It may be possible for parties to install undesired software into the NVM 16 which may, for example, damage the SoC 10 or enable unsolicited data retrieval from the SoC 10 or devices connected to the SoC 10, and thus it can be important to be able to verify the authenticity of software, especially if it has privileged access to sensitive data or operations. It is important to verify the authenticity of any updateable boot code or privileged firmware in particular, as malicious boot code or firmware can significantly alter the functionality of the SoC 10 to an attacker's benefit.

In some embodiments, at least a portion of firmware installed on the system NVM 16 is digitally signed using a private cryptographic key, and a secure boot process requires the firmware to be verified using a public cryptographic key, associated with the private key, before it can be executed by the processor 12. The term verify may be used to described determining, using a public cryptographic key, whether software stored in the program memory is validly signed by a private cryptographic key associated with the public cryptographic key. A developer may digitally sign firmware before installing it into the NVM 16 via a wired or wireless connection to the SoC 10. A public key, associated with the private cryptographic key and stored locally on the SoC 10, can then be used by the SoC 10 to verify the authenticity of the digitally signed firmware stored in the NVM 16. If no public key stored locally on the SoC 10 successfully verifies the digitally signed firmware, then the CPU 12 will not execute the firmware and a security exception may be signalled. The signed firmware installed in the NVM 16 is verified each time the SoC 10 is booted after being reset. In this way, a secure root of trust (ROT) can be established for the SoC 10.

The OTP key store 30 is used to store one or more of these public cryptographic keys. Public keys may be programmed into a manufacturer region the OTP key store 30 by a manufacturer of the SoC 10 during production of the SoC 10.

However, at least one region of the OTP key store 30 (e.g. a customer region) may be left empty after production, for receiving a later-loaded cryptographic public key—e.g. loaded by a customer such as a system integrator. As the OTP key store 30 comprises a one-time-programmable non-volatile memory, any cryptographic keys stored therein are read-only and cannot be erased or overwritten (either ever, or not without erasing the entire device memory, depending on how the OTP memory 30 is configured).

The cryptographic engine 28 is configured to attempt to verify firmware stored in the NVM 16 using the public keys stored in the OTP key store 30. The cryptographic engine 28 may comprise a secure processor and a secure storage medium (e.g. ROM) programmed with software instructions that cause the secure processor to perform this function. Alternatively, the system ROM 20 may comprise instructions that are retrievable by a secure processor in the cryptographic engine 28 in order to perform this function. In other embodiments, the cryptographic engine 28 need not have a processor but may comprise application-specific logic gates implementing a finite state machine, or any other appropriate hardware arrangement, in order to perform this function.

Typically, the SoC 10 will only have one primary firmware image installed thereon at any given time. The primary image may be the only firmware image on the SoC 10. Alternatively, it may be the first in a chain of images, in which each image is arranged to verify the next in the chain during a boot process. In some embodiments, the SoC 10 may store one or more secondary images, such as a firmware-update image, not chained with the primary image, but which the SoC 10 will boot only under when certain policy conditions are met, such as when a firmware update process has been initiated.

At least in some embodiments, only a single public key stored in the OTP key store 30 will successfully verify the primary firmware installed in the NVM 16 and enable the processor 12 to execute it. However, as it is impossible to overwrite keys stored in the OTP key store 30 due to its one-time-programmable nature, the OTP key store 30 may store one or more further public keys, potentially associated with earlier firmware images that have been installed in the NVM 16 in the past.

Each public key stored in the OTP key store 30 is associated with a respective revocation bit. Each revocation bit may be stored together in a single revocation region of the OTP key store 30, separate from one or more regions in which the public keys are stored. Alternatively, each revocation bit may be stored in a common region with its associated public key. When a key stored in the OTP key store 30 fails to successfully verify firmware stored in the NVM 16, during a boot process, the cryptographic engine 28 is configured immediately to revoke that key by setting its associated revocation bit, thereby marking that key as revoked. Keys that have been revoked by the cryptographic engine 28 are prevented from being accessed and used to verify firmware stored in the NVM 16.

This automatic revocation mechanism ensures that any manufacturer-installed keys will be automatically revoked as soon as a customer installs its own signed firmware and corresponding public customer key or keys in the customer region. This means the SoC 10 can never switch back to using a manufacturer-installed key after the customer has successfully installed its own firmware and keys, and so the original manufacturer identity for the SoC 10 is permanently disabled.

In one example embodiment, the OTP key store 30 is partitioned into two distinct regions. Each region can be locked independently of the other, to disable further writes to the locked region. A first region is dedicated to storing one or more manufacturer-originating public keys, which are typically installed during production of the SoC 10, before the SoC 10 is shipped to a customer. The second region is dedicated to storing one or more customer-originating public keys, as will be described in further detail below.

The PUF unit 22 contains hardware circuitry for generating a selectable one of a plurality of different bit sequences (hereinafter referred to as PUF keys) that are each unique to the particular implementation of the SoC 10. Each PUF key generated by the PUF unit 22 can be generated and output repeatedly and consistently. Each PUF key generated by the PUF unit 22 may be a 256-bit or 512-bit value, although other lengths may be generated in other embodiments. The PUF unit 22 may use any appropriate mechanism for generating PUF keys, but in some example embodiments it uses pair of transistors to generate each bit for each PUF key.

Figure 2:
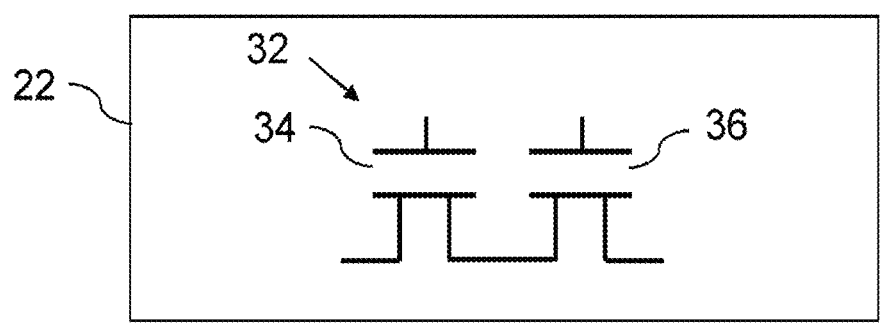
FIG. 2 is a diagram illustrating a representative binary cell of the PUF unit shown in FIG. 1.

FIG. 2 shows a representative binary cell 32 of the PUF unit 22. The cell 32 contains two transistors 34 & 36 which are arranged such that a small mismatch between them, arising from random manufacturing variations, determines which of the two will rupture first, when a competing oxide rupture process is performed. The outcome is stable and consistent, yet random and unpredictable between different SoC 10 devices all build to the same design.

Each binary cell 32 may directly generate a respective bit of a particular PUF key. However, in some embodiments the PUF unit 22 may contain more binary cells than the combined bit length of the plurality of PUF keys the PUF unit can generate, and may generate additional helper bits for use within error-correction circuitry in the PUF unit 22 in order to ensure the stability of the generated PUF keys even in changing environmental conditions.

The key derivation unit 26 is configured to receive a PUF key output by the PUF unit 22, over the system bus 14, and use it to generate or derive one or more cryptographic device identity keys or key pairs that are unique to the SoC 10. The key derivation unit 26 may do this in any appropriate manner. For example, the key derivation unit 26 may be arranged to perform one or more hash functions or key expansion processes on a PUF key output by the PUF unit 22. The key derivation unit 26 may comprise application-specific hardware (e.g. an arrangement of transistors) configured to perform this function. Alternatively, the key derivation unit 26 may comprise a secure processor and a secure storage medium (e.g. ROM) programmed with instructions that cause the secure processor to perform this function, or the key derivation unit 26 may comprise a secure processor arranged to retrieve instructions from the system ROM 20 in order to perform this function.

The PUF unit 22 and key derivation unit 26 together provide a hardware-based key generation system as described herein.

However, in certain embodiments, a PUF key output by the PUF unit 22 may be used directly as a cryptographic device identity key—e.g. as a private device key. In such embodiments, there may be no key derivation unit as such. In this case, the PUF unit 22 alone may be a hardware-based key generation system.

The process of generating a cryptographic device identity key or key pair is repeatable—i.e. the key derivation unit 26 is configured to generate the same cryptographic key or key pair each time it receives the same bit sequence from the PUF unit 22. It is also preferably irreversible—i.e. it is infeasible to determine the PUF key that was used to generate a cryptographic device identity key from the device identity key alone.

The device identity key or key pair generated by the key derivation unit 26 may be used by other devices in wired or wireless communication with the SoC 10 in order to verify the identity of the SoC 10 and/or to attest the integrity of the SoC 10. For example, an external database may store public cryptographic keys associated or paired with respective private device identity keys of a set of SoCs 10, all fabricated to the same design. The database may then be used to determine if the device identity key generated by the key derivation unit 26 of a particular SoC 10 is validly associated with one of the public keys held in the database, as part of a cryptographic verification or attestation protocol, in order to determine whether to permit access to certain services—including but not limited to software and/or firmware updates, remote secure provisioning, remote life-cycle state management, etc. If the verification or attestation fails, then the SoC 10 may be denied access to such services.

The PUF unit 22 in this SoC 10 is connected to the key derivation unit 26 over the system bus 14, but in other embodiments the PUF unit 22 may sit within the secure cryptographic module 24 and be coupled to the key derivation unit 26 by the secure bus 31.

Typically, the manufacturer of the SoC 10 will install digitally signed firmware (signed with a private manufacturer cryptographic key) in the NVM 16 before shipping the SoC 10 to a customer, and will write the public cryptographic key associated with the private key into the first region of the OTP key store 30. Then, each time the SoC 10 is booted, the firmware stored in the NVM 16 is verified by the cryptographic engine 28 using the manufacturer-installed public key stored in the OTP key store 30. This ensures that the firmware installed in the NVM 16 is authentically produced by the manufacturer. After successful firmware verification, the PUF unit 22 is caused to output a specific PUF key to the key derivation unit 26, which then in turn derives a corresponding device identity key or key pair. This process may be controlled autonomously by the cryptographic module 24 and PUF unit 22, or may be coordinated by the system CPU 12 executing hard-wired boot code from the system ROM 20.

For security reasons, the PUF unit 22 is configured to only output a PUF key only once per reset (and hence per boot) of the SoC 10. This functionality may be enabled through the use of hardware (e.g. a physical switch) or immutable software (e.g. instructions installed in the ROM 20). This is done in order to prevent unintended disclosure of the PUF key as explained below.

The manufacturer, during production of the SoC 10, may extract the public cryptographic key associated or paired with the private device identity key, generated by the key derivation unit 26, and may store it in an external database. If, and for as long as, manufacturer-originating firmware is installed in the NVM 16, and can be successfully verified using a public cryptographic key stored in the first region of the OTP key store 30, the device identity key of the SoC 10 remains identical from boot to boot. Thus, the manufacturer is able to identify and verify the integrity of the SoC 10 by determining that the device identity key generated by the key derivation unit 26 on each boot of the SoC 10 is validly associated with the public key stored in the external database. If a valid association is found, the identity of the SoC 10 is verified and the manufacturer is able to provide services such as those listed previously to the device, with the knowledge that the SoC 10 is running manufacturer-installed firmware that has been verified using a manufacturer-installed key stored in the first region of the OTP key store 30.

Some purchasers of the SoC 10 may wish to replace the manufacturer-installed firmware installed on the SoC 10 with their own firmware. In order to do so, a customer may install their own firmware image in the system NVM 16, replacing the manufacturer-installed firmware image. Such firmware may be loaded through a debug port or by an over-the-air firmware update process. Such firmware may, like the manufacture-installed firmware, be protected by a digital signature signed using a private key associated with the customer. The customer may desire that the integrity of the customer-installed firmware can be attested, using the root of trust of the SoC 10, If so, the firmware may be indicated as requiring signature verification, within the boot process of the SoC 10, using a customer public key, paired with the customer private signature key, before it is allowed to be executed by the processor 12.

The second region of the OTP key store 30 is provided in order to enable a customer to install their own public key or keys required to verify such customer-installed firmware. A customer can be permitted to install their own cryptographic keys in this second region of the OTP key store 30, but will be unable to install cryptographic keys in the first region of the OTP key store 30, in which manufacturer-installed keys are already stored, due to the write-once nature of the OTP memory 30. A customer may be able to install their own public keys into the second region through a debug port or through another wired or radio link. Once a customer has installed their own signed firmware image on the NVM 16, and has installed an associated customer public key in the second region of the OTP key store 30, only the customer-installed public key installed in the second region will successfully verify the firmware image installed in the NVM 16. The manufacturer-installed key or keys in the first region of the OTP key store will not successfully verify the customer-installed firmware images.

Once a customer has installed their own firmware image in the NVM 16 of the SoC 10, the manufacturer may wish to prevent the SoC 10 from accessing services and privileges available to SoCs 10 running authentic manufacturer-installed firmware. Conversely, the customer may wish to prevent the manufacturer from being able to access data stored on the SoC 10, or remotely control the SoC 10, in order to preserve the privacy of the customer and of the SoCs 10 it has purchased.

The PUF unit 22 and key derivation unit 26 are therefore configured to cooperate to generate a selectable device identity key, of a plurality of predetermined device identity keys, depending on whether signed firmware currently stored in the system NVM 16 has been signed by the manufacturer or by the customer. The selection is controlled by the boot process, based on the contents of the system NVM 16 and the OTP key store 30.

In the present example embodiment, the hardware-based key generation system, comprising the PUF unit 22 and the key derivation unit 26, is configured to output a selectable device identity key of two predetermined device identity keys. It can also generate and output a corresponding selectable public key, to forms an asymmetric key pair comprising the selected (private) device identity key.

In some embodiments, the PUF unit 22 may be configured to output a selectable PUF key of a plurality of different PUF keys—e.g. the PUF unit 22 may be configured to output a selectable one of two different PUF keys. The PUF unit 22 may comprise two individual PUF sub-units, each configured to output their own PUF key, and a mechanism for selecting which PUF unit within the PUF unit 22 is used to output the PUF key to the key derivation unit 26 on a boot of the SoC 10. In some embodiments, the PUF unit 22 may be configured to generate a PUF key of total length X bits and be configured to output only a selectable portion of the entire PUF key on any given boot of the SoC 10. For example, one selectable portion of the PUF key may comprise the first X/2 bits of the entire PUF key, and the other selectable portion may comprise the last X/2 bits of the entire PUF key. The selected PUF key is then output to the key derivation unit 26, which generates a device identity key based on the received PUF key. By supplying a selectable one of two possible PUF keys to the key derivation unit 26, the key derivation unit 26 can be considered to output a selectable one of two possible device identity keys.

In other embodiments, the PUF unit 22 may be configured to output only a single PUF key, and the key derivation unit 26 may be configured to output a selectable one of a plurality of device identity keys derived from the PUF key it receives from the PUF unit 22. For example, the key derivation unit 26 may be configured to perform a selectable one of a plurality of key derivation functions (e.g. hash functions and/or key expansion functions) on the received PUF key in order to generate a selectable one of a plurality of device identity keys. The key derivation unit 26 may be configured to output a selectable one of two key derivation functions on the received PUF key. This may be implemented through immutable software (e.g. a processor and a coupled ROM, which may be the system ROM 20), or through hardware (e.g. a selectable one of two different transistor arrangements).

The device identity key output by the hardware-based key generation system is selected in dependence on which region of the OTP key store 30 stores a public key that successfully verifies the firmware image installed in the NVM 16 in a cryptographic signature verification process performed by the cryptographic engine 28 during booting of the SoC 10. If the NVM 16 stores a manufacturer-installed firmware image which is successfully verified by the cryptographic engine 28 using a manufacturer-installed public key stored in the first region of the OTP key store 30, the hardware-based key generation system will output a first of two possible device identity keys (i.e. a manufacturer-specific device identity key). If the NVM 16 stores a customer-installed firmware image which is successfully verified by the cryptographic engine 28 using a customer-installed public key stored in the second region of the OTP key store 30, the hardware-based key generation system will output the second of two possible device identity keys (i.e. a customer-specific device identity key). This may be implemented by the PUF unit 22 being configured to output a selectable one of two different PUF keys (e.g. a customer PUF key or a manufacturer PUF key) as described above, and the key derivation unit 26 being configured to perform the same key derivation function on a received PUF key in order to generate one of two possible device-identity key pairs, each having a respective private device-identity key, in dependence on which PUF key is received from the PUF unit 22. The instructions for performing this functionality are stored within the system ROM 20 so cannot be modified by an attacker.

It will be appreciated therefore that the SoC 10 is configured to generate a selectable one of two possible device identity keys: the first being associated with manufacturer-installed firmware and the second being associated with customer-installed firmware. Through its hard-wired configuration, the SoC 10 prevents access to the customer-associated device identity key and the PUF key to generate it when the NVM 16 stores manufacturer-installed firmware that is verified by a public key stored in the first region of the OTP key store 30, because the PUF unit 22 is physically prevented from outputting more than one PUF key per boot (i.e. it can only output the currently-selected PUF key). Similarly the SoC 10 prevents access to the manufacturer-associated device identity key and the PUF key used to generate it when the NVM 16 stores customer-installed firmware that is verified by a public key stored in the second region of the OTP key store 30.

Thus, only the customer will be able to securely identify and attest the SoC 10 once the SoC 10 is loaded with validly-signed customer-installed firmware and the corresponding customer signature-verification key. In particular, the manufacturer will no longer be able to do this. Thus customer's privacy and the security of the device are enhanced.

Figure 3:
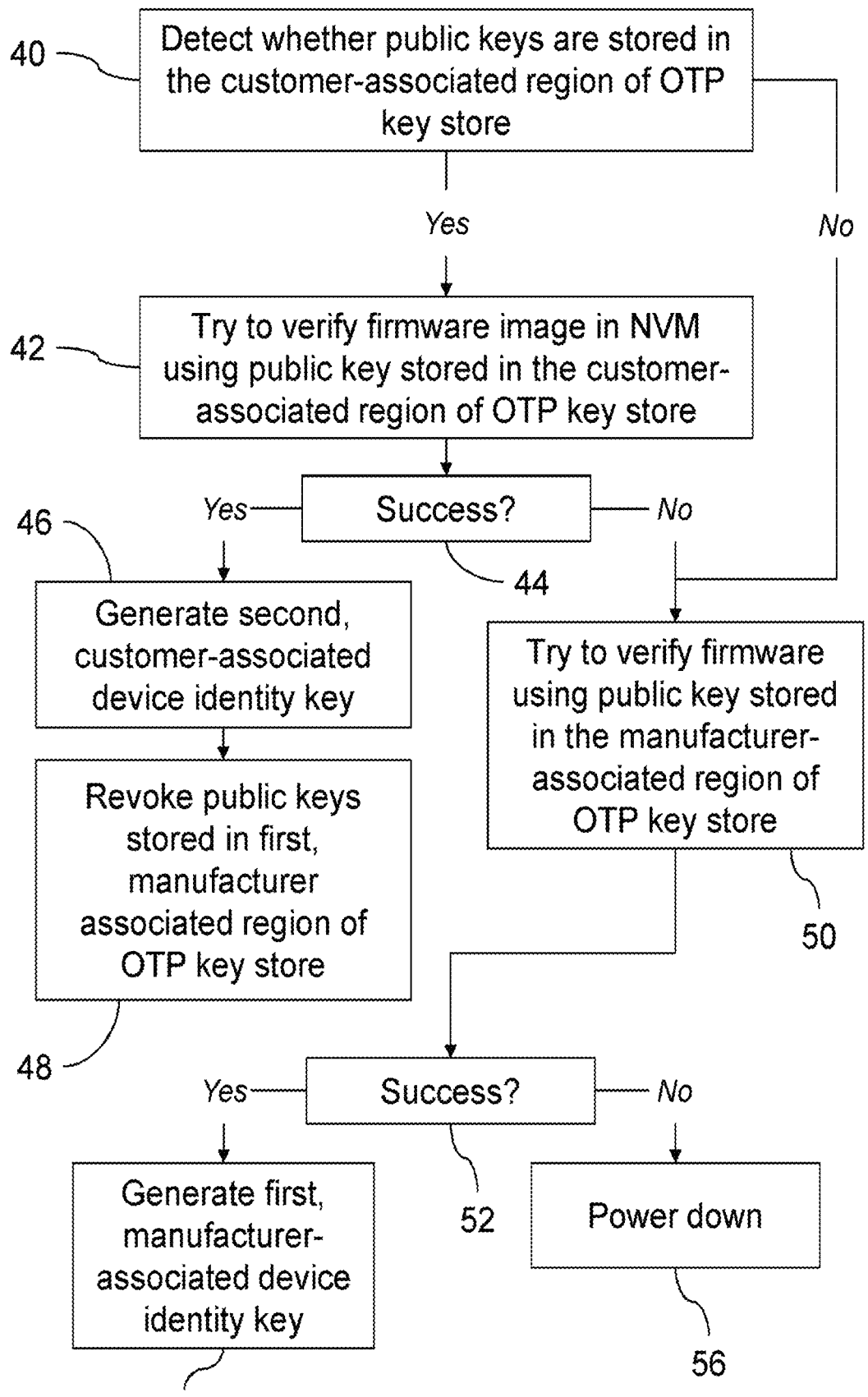
FIG. 3 is a flowchart illustrating the process by which the SoC shown in FIG. 1 selects which device identity key to generate in accordance with an embodiment of the invention.

FIG. 3 shows a flowchart summarising the process by which the SoC 10 selects which device identity key to generate on boot.

After a system reset (e.g. a power-on reset), the SoC 10 starts at step 40 in which it detects whether any public keys are stored in the second, customer-associated region of the OTP key store 30. If one or more keys are detected in this second region, the SoC 10 proceeds to step 42. If no keys are detected in this second region, the SoC 10 instead proceeds to step 50.

At step 42, the SoC 10 attempts to verify a digitally signed firmware image stored in the NVM 16 using each unrevoked key stored in the second region, trying each key sequentially, ordered by memory address, if there are multiple such keys. There may be only a single key stored in the second region. The SoC 10 then proceeds to step 44 at which it determines whether any of the keys stored in the second region successfully verify the firmware image. If a key in the second region does successfully verify the firmware image, the SoC 10 proceeds to step 46. If not, the SoC 10 instead proceeds to step 50.

At step 46, the SoC 10 generates one or more second, customer-associated device identity keys of key pairs using one of the mechanisms described above, or any other appropriate mechanism. The generated key or keys may be passed to the cryptographic engine 28, over the secure bus 31, for storage and subsequent use, e.g. in a device-attestation protocol. The SoC 10 then proceeds to step 48 at which the SoC 10 revokes any unrevoked public keys stored in the first, manufacturer-associated region of the OTP key store 30. This may be done by changing the value of the revocation bit associated with each respective public key. The system ROM 20 may comprise instructions that cause keys stored in the first region to be automatically revoked after a successful verification of a firmware image using a key stored in the second region. By making sure a key in the second region successfully verifies the firmware image in the NVM 16 before any keys in the first region are revoked, rather than revoking keys in the first region merely in response to a key being present in the second region, the SoC 10 can be prevented from becoming completely unbootable (being "bricked"), or from only being able to execute unverified firmware (i.e. without established as full a root of trust), due to a faulty loading of customer-installed firmware or customer public keys, as the SoC 10 retains the ability to verify and securely execute manufacturer-provided firmware images using the key(s) stored in the first region.

At step 50, the SoC 10 attempts to verify the firmware image stored in the NVM 16 using each unrevoked key stored in the first region of the OTP key store 30, sequentially by memory address. There may be only a single key stored in the first region. The SoC 10 then proceeds to step 52 at which it determines whether any of the keys stored in the first region successfully verify the firmware image. If a key in the first region does successfully verify the firmware image, the SoC 10 proceeds to step 54. If not, the SoC 10 instead proceeds to step 56.

At step 54, the SoC 10 generates the first, manufacturer-associated device identity key using one of the mechanisms described previously, or any other appropriate mechanism. At step 56, the SoC 10 powers down, as no key stored in the first or second regions of the OTP key store 30 successfully verifies the firmware image, and thus there is either an error in the firmware image or an error in the public keys stored in the OTP key store 30. Alternatively, the SoC 10 may proceed to boot but may signal that it has been unable to establish a secure root of trust.

Once the firmware image in the NVM 16 has been verified, and a corresponding manufacturer or customer device identity key has been generated by the hardware-based key generation system, the SoC 10 continues with the secure boot process.

It will also be appreciated that these steps may be performed in any appropriate order, and are not limited to the order described here or shown in the drawings.

Figure 4:
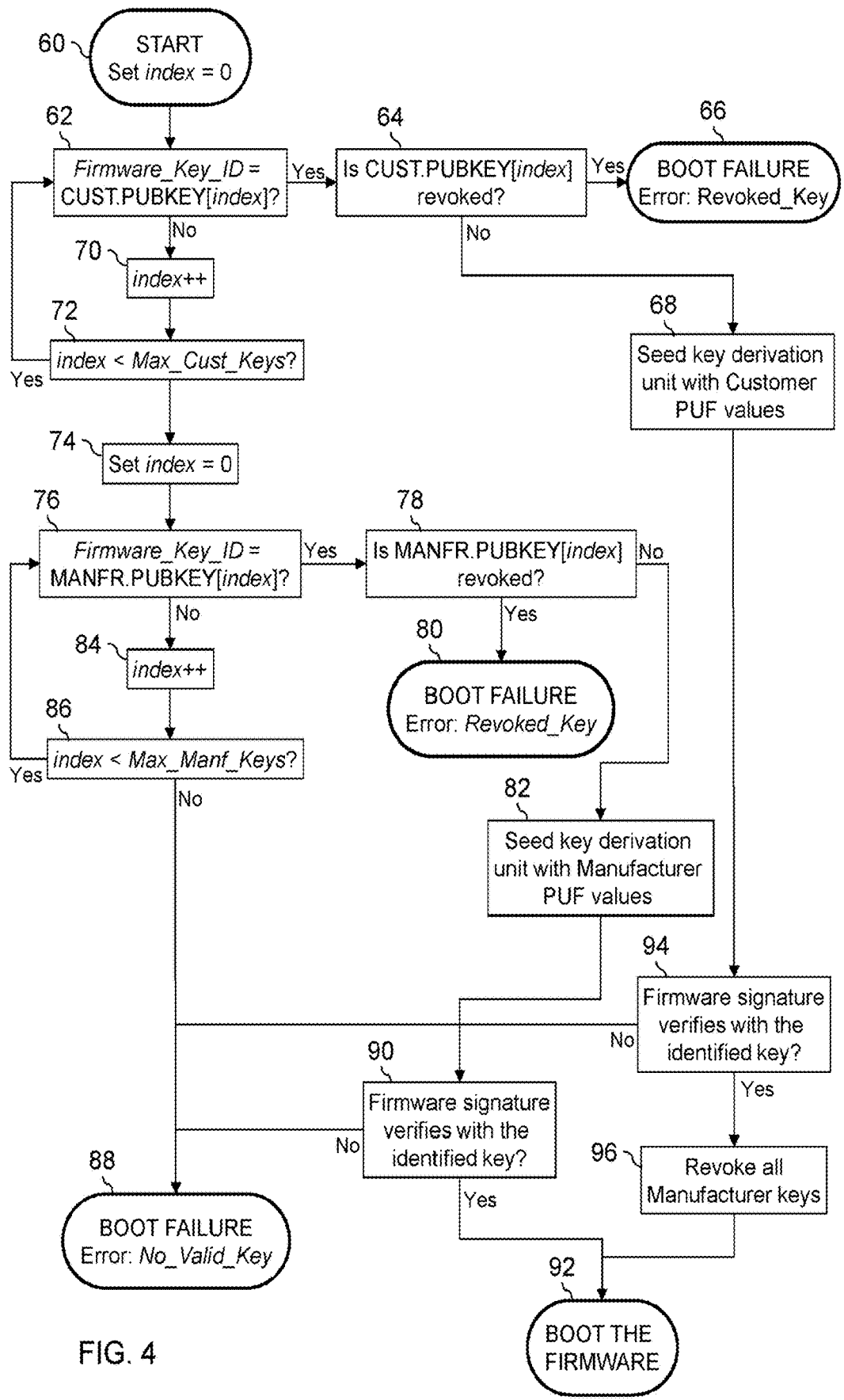
FIG. 4 is a flowchart illustrating a boot process performed by an SoC embodying the invention.

FIG. 4 describes a boot process, implemented by ROM boot code executing on an SoC embodying the invention, which may be the SoC 10 of a variant thereof. It implements similar steps to those described in FIG. 3, albeit in a slightly different order. The handling of key revocation is also slightly different. This boot process also supports the presence of multiple customer keys and/or multiple manufacturer keys on the device. This can allow successive firmware updates to be signed with different public keys, e.g. in case a public key has been compromised.

In this example, the OTP key store is divided into two regions, each of which can stores an array of keys, with the keys of each array being addressable by an integer index into the array. Each array entry can store a public key, a key identifier (a bit-string that has been uniquely assigned to the key), and a binary revocation flag for the key. The first region is a manufacturer region and is sized to store up to a maximum of Max_Manf_Keys in a manufacturer key array, MANFR.PUBKEY[i−1] for i=1, . . . , Max_Manf_Keys. The second region is a customer region and is sized to store up to a maximum of Max_Cust_Keys in a customer key array, CUST.PUBKEY[i−1] for i=1, . . . , Max_Cust_Keys. Some of the array entries may be empty.

The non-volatile system memory of the SoC can store a primary firmware image. The firmware image includes an associated key identifier value, Firmware_Key_ID, and a cryptographic signature, at respective predetermined addresses, both of which are readable by the boot code.

Upon a system boot (e.g. after a power-on or other device reset), the SoC initiates the boot process. In a first step 60 of FIG. 4, an integer variable, index, stored in RAM, is initialised to zero. In a second step 62, the SoC reads Firmware_Key_ID from the primary firmware image, and reads the key identifier of the key indexed by index in the customer key array, and checks whether they are equal. If they match, the boot code checks 64 whether the revocation bit for the indexed key has been set. If it has been set, indicating the key has been revoked, the boot process fails 66 and terminates with a "Revoked_Key" error status. This means that the device will not be bootable if the customer has revoked the current key without first having updated the firmware so that the primary firmware no longer refers to the identifier of the revoked key.

If the matching key has not been revoked, the boot process causes the PUF unit to seed 68 the key derivation unit with customer PUF values. If the key identifiers don't match at step 62 (which could be because the array entry is empty, or because the current firmware is signed with a key that appears later in the array), the value of index is incremented 70, and is compared 72 against the capacity limit of the customer array, Max_Cust_Keys. If it is still below the maximum (i.e. the last key entry has not yet been read), the process loops back to step 62 and the next key in the customer key array is checked. If the last key entry has been read and no match found, the boot process proceeds to examine the manufacturer key array. This will occur if the customer key array is empty, because no customer firmware or keys have yet been loaded to the device, but it will also happen if a customer has attempted to load customer firmware but has made a mistake and has failed to load a customer key having a key identifier matching the Firmware_Key_ID value.

The variable index is reinitialised 74 to zero. The SoC again reads Firmware_Key_ID from the primary firmware image, and reads the key identifier of the key indexed by index, but this time from the manufacturer key array, and checks 76 whether these are equal. If they match, the boot code checks 78 whether the revocation bit for the indexed key has been set. If it has been set, indicating the key has been revoked, the boot process fails 80 and terminates with a "Revoked_Key" error status. This means that the device will not be bootable if the manufacturer has revoked the current key without the firmware having been updated so that it no longer refers to the identifier of the revoked manufacturer key.

If the matching key has not been revoked, the boot process causes the PUF unit to seed 82 the key derivation unit with manufacturer PUF values. If the key identifiers don't match at step 76, the value of index is incremented 84, and is compared 86 against the capacity limit of the manufacturer array, Max_Manf_Keys. If it is still below the maximum (i.e. the last key entry has not yet been read), the process loops back to step 76 and the next key in the manufacturer key array is checked. If the last key entry has been read and no match found, the boot process fails 88 and terminates with a "No_Valid_Key" error status. This will occur if no firmware and key with matching IDs are present on the device.

If the key derivation unit has been seeded 82 with manufacturer PUF values, the boot process proceeds to use the cryptographic engine to determine 90 whether the cryptographic signature of the primary firmware image can be verified using the manufacturer public key with matching key identifier, identified by the boot process in the manufacturer key array. If the signature cannot be verified by the identified manufacturer key, the boot process fails 88 and terminates with a "No_Valid_Key" error status. If the signature of the primary firmware image is determined to be valid, execution passes to the verified manufacturer-loaded firmware, which is then booted 92.

If the key derivation unit was instead seeded 68 with customer PUF values, the boot process uses the cryptographic engine to determine 94 whether the cryptographic signature of the primary firmware image can be verified using the customer public key with matching key identifier, identified by the boot process in the customer key array. If the signature cannot be verified by the identified customer key, the boot process fails 88 and terminates with a "No_Valid_Key" error status. If the signature of the primary firmware image is determined to be valid, the boot process next revokes 96 all the keys in manufacturer key array, and makes it impossible for any manufacturer key ever to be matched in future, by setting the revocation bits of every key slot in the manufacturer key array, whether the slot is occupied or not. In this way, the key derivation unit can never again be seeded with the manufacturer PUF values, and the SoC can never revert to operating with a manufacturer identity. Execution then passes to the verified customer-loaded firmware, which is then booted 92.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
   a processor;
   a program memory;
   a hardware-based key generation system configured to output a selectable device identity key of a plurality of predetermined device identity keys; and
   a one-time programmable (OTP) memory for storing one or more public cryptographic keys,
   wherein the device is configured:
   when a public cryptographic key is stored in the OTP memory, and when software is stored in the program memory, to use the public cryptographic key to determine whether the software stored in the program memory is validly signed by a private cryptographic key associated with the public cryptographic key, before the software is executed by the processor; and
   to control which device identity key of the plurality of predetermined device identity keys is output by the hardware-based key generation system at least partly in dependence on an outcome of said determination and on a location, within the OTP memory, of the public cryptographic key.

2. The integrated-circuit device of claim 1, configured to generate a first device identity key when software developed by a first party is stored in the program memory and a public cryptographic key associated with the first party is stored in the OTP memory, and to generate a second device identity key, different from the first device identity key, when software developed by a second party is stored in the program memory and a public cryptographic key associated with the second party is stored in the OTP memory.

3. The integrated-circuit device of claim 1, comprising a read-only memory storing boot code for execution by one or more processors of the device in response to the device being reset or booted, wherein the boot code comprises instructions for determining whether software stored in the program memory is validly signed by a private cryptographic key associated with a public cryptographic key stored in the OTP memory and for controlling which device identity key of the plurality of predetermined device identity keys is output by the hardware-based key generation system.

4. The integrated-circuit device of claim 1, configured for accessing public cryptographic keys from a plurality of predetermined regions of the OTP memory, and wherein the OTP memory comprises a first region for storing a first set of one or more public cryptographic keys, and a second region, distinct from the first region, for storing a second set of one or more public cryptographic keys.

5. The integrated-circuit device of claim 4, configured to control the hardware-based key generation system to output a selectable device identity key of two predetermined device identity keys, the device identity key being selected in dependence on which of the first and second regions of the OTP memory stores a public cryptographic key that verifies software installed in the program memory.

6. The integrated-circuit device of claim 1, wherein the hardware-based key generation system is configured for generating a respective public key, of a public-private key pair, for each of the predetermined device identity keys.

7. The integrated-circuit device of claim 1, configured to use a device identity key output by the hardware-based key generation system and a public cryptographic key stored in the OTP memory for establishing a root of trust for the device.

8. The integrated-circuit device of claim 1, configured to use the device identity key to attest, to an external party, an integrity of some or all the software stored in the program memory.

9. The integrated-circuit device of claim 1, wherein the hardware-based key generation system is configured to output only one device identity key of the plurality of the predetermined device identity keys after each reset of the device.

10. The integrated-circuit device of claim 9, wherein the hardware-based key generation system is configured to output said one device identity key at most once after each reset of the device.

11. The integrated-circuit device of claim 1, wherein the hardware-based key generation system comprises a physical-unclonable-function (PUF) unit configured to output a selectable physical-unclonable-function (PUF) key, comprising a predetermined bit sequence, of a plurality of predetermined PUF keys.

12. The integrated-circuit device of claim 11, wherein the hardware-based key generation system further comprises a key derivation unit configured to receive the PUF key output by the PUF unit, and to derive a device identity key from the received PUF key.

13. The integrated-circuit device of claim 1, configured to attempt verification of software stored in the program memory using one or more keys stored in a second region of the OTP memory, before attempting verification of software stored in the program memory using one or more keys stored in a first region of the OTP memory.

14. The integrated-circuit device of claim 1, wherein the OTP memory comprises one or more regions for storing one or more revocation bits, each revocation bit being associated with a respective public cryptographic key of a plurality of public cryptographic keys in the OTP memory, wherein the device is configured to prevent a public cryptographic key associated with a revocation bit that has a predetermined revoked value from being used by the device in order to verify software stored in the program memory.

15. The integrated-circuit device of claim 14, configured to set a respective revocation bit associated with each key stored in a first region of the OTP memory to the predetermined revoked value in response to determining that software stored in the program memory is validly signed by a private cryptographic key associated with the public cryptographic key stored in a second region of the OTP memory.

16. The integrated-circuit device of claim 1, configured to attempt verification of software stored in the program memory each time the device is booted.

17. A method of generating a predetermined device identity key for an integrated-circuit device, the device comprising:
    a processor;
    a program memory;
    a hardware-based key generation system configured to output a selectable device identity key of a plurality of predetermined device identity keys; and
    a one-time programmable (OTP) memory for storing one or more public cryptographic keys,
    wherein the method comprises:
    using a public cryptographic key stored in the OTP memory to determine whether software stored in the program memory is validly signed by a private cryptographic key associated with the public cryptographic key, before the software is executed by the processor; and
    controlling which device identity key of the plurality of predetermined device identity keys is output by the hardware-based key generation system at least partly in dependence on an outcome of said determination and on a location, within the OTP memory, of said public cryptographic key.

18. The method of claim 17, wherein the software stored in the program memory comprises a digitally signed boot code or firmware image.

19. The method of claim 17, further comprising:
    generating a first device identity key when software developed by a first party is stored in the program memory and a public cryptographic key associated with the first party is stored in the OTP memory; and
    generating a second device identity key, different from the first device identity key, when software developed by a second party is stored in the program memory and a public cryptographic key associated with the second party is stored in the OTP memory.

20. The method of claim 17, wherein the OTP memory comprises a first region and a second region, the method further comprising:
    determining that the software stored in the program memory is not validly signed by a private cryptographic key associated with any of one or more public cryptographic key stored in the second region of the OTP memory; and
    in response, attempting to verify the software stored in the program memory using one or more public cryptographic keys stored in the first region of the OTP memory.

* * * * *